United States Patent [19]

Watanabe et al.

[11] 4,435,542

[45] Mar. 6, 1984

[54] POLYOL RESIN

[75] Inventors: Shoji Watanabe; Takuya Miho, both of Ohtake, Japan

[73] Assignee: Daicel Chemical Industries, Ltd., Sakai, Japan

[21] Appl. No.: 354,003

[22] Filed: Mar. 2, 1982

[30] Foreign Application Priority Data

Mar. 23, 1981 [JP] Japan ................................ 56-42035

[51] Int. Cl.$^3$ .............................................. C08F 8/28
[52] U.S. Cl. .................................... 525/118; 525/162; 525/123; 525/378.8; 525/386
[58] Field of Search ..................... 525/386, 328.8, 123, 525/118, 162

[56] References Cited

U.S. PATENT DOCUMENTS 2,526,434 10/1950 Tawney ............................ 525/328.8
3,800,006 3/1974 Katayama et al. ................. 525/386
3,843,572 10/1974 Morgan ............................ 525/328.8
4,098,970 7/1978 Hahn ............................... 525/328.8

Primary Examiner—Joseph L. Schofer
Assistant Examiner—Bernard Lipman
Attorney, Agent, or Firm—Flynn, Thiel, Boutell & Tanis

[57] ABSTRACT

A polyol resin is disclosed which is obtained by reacting 95 to 40% by weight of an aromatic vinyl monomer-allyl alcohol copolymer with 5 to 60% by weight of ε-caprolactone or ε-hydroxycaproic acid. The polyol resin can be reacted with a crosslinking agent to form a coating film.

13 Claims, No Drawings

POLYOL RESIN

The present invention relates to a novel polyol resin for coating which is rendered crosslinkable and curable at normal temperatures under heating by incorporation of a crosslinking agent capable of reacting with a hydroxyl group.

Recently, with increased demands for saving of energies and resources and broadening and diversification of application fields, resins having high capacity and high quality have been desired.

In the field of coating compositions, novel paints such as aqueous paints, high-solid paints, powdery paints, electrostatic deposition paints, ultraviolet ray-curable paints and elastic paints have been developed. Conventional resins are not satisfactory in quality as resins to be incorporated into these paints and there have been proposed various novel resins.

As a resin that is rendered crosslinkable and curable at normal temperatures or under heating by incorporation of a crosslinking agent capable of reacting with a hydroxyl group, there have heretofore been used alkyd resins, oil-free polyester resins, polyester polyols, polyether polyols, epoxy resins, acrylic polyols and the like. Various coating compositions are formed by mixing these resins with a crosslinking agent capable of reacting with a hydroxyl group, such as a polyisocyanate, blocked isocyanate or melamine resin, a resin such as a cellulose resin, for example, cellulose nitrate or cellulose acetate butyrate, an epoxy resin, a vinyl chloride resin or a vinyl acetate, a pigment, a solvent and other additives.

In case an alkyd resin is used as a hydroxyl group-containing resin, most of the hydroxyl groups are secondary hydroxyl groups which are poor in reactivity with a crosslinking agent. In the synthesis of such resin, it is very difficult to simultaneously increase both the OH group concentration and the molecular weight. Another defect of such alkyd resin is that the water resistance and weatherability are poor. An oil-free alkyd or polyester polyol resin contains primary OH groups having a high reactivity and are used for many urethane coating compositions. However, a resin of this type is poor in water resistance because of the presence of polyester linkages. Furthermore, when the resin of this type is employed, it is difficult to obtain a coating having a quick drying property and a satisfactory hardness.

Polyether polyols are used in large quantities in fields where a high water resistance is required, for example, for manufacture of urethane foams and flooring materials. However, since these resins are poor in weatherability and heat resistance, they are hardly used in the field of coating compositions. Acrylic polyol resins obtained by radical-copolymerizing a hydroxyalkyl acrylate or methacrylate represented by 2-hydroxyethyl methacrylate with an acrylic acid ester or styrene have been recently used in large quantities for normal temperature-drying urethane coating compositions, baking and crosslinking urethane coating compositions and baking melamine coating compositions. For example, such acrylic polyol resins are used in fields where high weatherability, high chemical resistance, high water resistance, high stain resistance and high hardness are required. More specifically, they are used for acrylic urethane paints for repairing automobiles, baking paints for household electric devices, metallic paints for automobiles and outdoor wall paints.

However, in the case of acrylic polyol resins, it is very difficult to obtain coatings excellent in flexibility. Moreover, since hydroxyl groups are bonded to parts close to the main skeleton of the acrylic resin, only the minority of hydroxyl groups react with a crosslinking agent.

Although a high molecular weight oligomer of an epi-bis type epoxy resin contains hydroxyl groups, these hydroxyl groups are secondary hydroxyl groups poor in reactivity, and since the resin per se is too solid or rigid, it cannot be used for coating as it is.

We made researches with a view to developing a novel resin free from the foregoing defects of the conventional resins, and we have now completed the present invention. More specifically, in accordance with the present invention, there is provided a polyol resin obtained by reacting 95–40 parts by weight of a copolymer with 5–60 parts by weight of ε-caprolactone.

This resin comprises as a skeleton a hard polyol having a softening point of 90° to 115° C. and an OH value of 180 to 260, and a soft polycaprolactone bonded as a side chain to the polyol skeleton by ring-opening grafting reaction. Accordingly, primary hydroxyl groups excellent in reactivity are located on the ends of the side chains. When the resin is modified with a polybasic acid or an anhydride thereof to introduce carboxyl groups, the speed of crosslinking reaction of primary hydroxyl groups with an isocyanate or melamine resin can optionally be controlled. For example, in case of a two-pack type urethane paint formed by incorporation of an isocyanate having a high reactivity, the pot life after mixing is often too short. In such case, if the degree of modification with a polybasic acid is reduced to reduce the acid value of the resin, an appropriate pot life can be obtained. In contrast, if an isocyanate having a low reactivity is used, an appropriate curing speed can be obtained by increasing the acid value. Furthermore, appropriate introduction of carboxyl groups is effective for improving the adhesion to the coated surface.

Another characteristic of the resin of the present invention is that the flexibility and hydroxyl group concentration can optionally be adjusted according to various uses by changing the reaction ratio between the aromatic vinyl monomer-allyl alcohol copolymer resin as the hard skeleton, such as a styrene-allyl alcohol resin, and ε-caprolactone as the soft side chain component. More specifically, if the proportion of ε-caprolactone is reduced, a hard resin having a high OH value is obtained, and if the proportion of ε-caprolactone is increased, a soft resin having a low OH value is obtained. Since the resin comprises a hard resin skeleton and a soft side chain structure containing terminal hydroxyl groups, a coating formed by curing the resin with a crosslinking agent is excellent in flexibility, and in this point the resin of the present invention is different from the conventional acrylic polyol.

Still another characteristic of the resin of the present invention is that the water resistance is excellent. An ordinary alkyd or polyester polyol resin is readily hydrolyzed because of the presence of ester linkages. In contrast, in the resin of the present invention, the polycaprolactone, that is, a polyester having highest water resistance among polyesters, is bonded as the side chain to the main chain composed of carbon-to-carbon linkages, and therefore, the resin of the present invention has an excellent water resistance.

Moreover, by virtue of carbon-to-carbon linkages and ester linkages, the resin of the present invention has an excellent comparability with many resins and crosslinking agents for paints.

The aromatic vinyl monomer-allyl alcohol resin which is the main component of the resin of the present invention may be obtained by copolymerizing an aromatic vinyl monomer with an excessive amount of allyl alcohol in the presence of hydrogen peroxide or other peroxide as a catalyst and removing excessive allyl alcohol. As the aromatic vinyl monomer, there can be mentioned, for example, styrene and α-methylstyrene, and styrene is especially preferred. The resin obtained according to this process has an OH value of 180 to 260, a number average molecular weight of 1000 to 1600, a softening point of 95° to 115° C. and is hard and brittle. As such resin, there can be used SAA resin RJ-100 and SAA resin RJ-101 marketed by Monsanto Co. (U.S.A.).

In the present invention, the aromatic vinyl monomer-allyl alcohol copolymer resin is used in an amount of 95–40% by weight, preferably 80–50% by weight. When the amount of the copolymer resin is larger than 95% by weight, the resin is too hard and the hydroxyl value is too large, and therefore, the compatibility with other paint resins and the solvent solubility are degraded.

If the amount of the copolymer resin is smaller than 40% by weight, since the amount of $\epsilon$-caprolactone is increased, the resin becomes too soft and furthermore, the solvent compatibility is reduced because of the crystallinity of the caprolactone side chain.

$\epsilon$-Caprolactone as the secondary main component of the present invention is used in an amount of 5–60% by weight, preferably 20–50% by weight. If the amount of $\epsilon$-caprolactone is too large or too small, it is difficult to obtain appropriate flexibility, solubility and compatibility. A ring-opening product of $\epsilon$-caprolactone, that is, $\epsilon$-hydroxycaproic acid, may be used instead of $\epsilon$-caprolactone. $\epsilon$-Caprolactone is subjected to ring-opening esterification with the primary hydroxyl group based on allyl alcohol of the aromatic vinyl monomer-allyl alcohol resin to form a soft side chain of the aromatic vinyl monomer-allyl alcohol resin. This esterification is different for ordinary dehydration esterification between carboxyl and hydroxyl groups in the point that a primary OH group is produced on the end of the grafted caprolactone side chain and the number of total hydroxyl groups of the resin is not changed at all.

When the resin of the present invention is modified with a polybasic acid or an anhydride thereof, the polybasic acid or its anhydride is used in an amount of up to 10% by weight, preferably up to 5% by weight. If the amount of the polybasic acid or its anhydride is larger than 10% by weight, the viscosity of the resin is increased and there is a risk of occurrence of gelation during the reaction. When a polybasic acid is used, it is bonded in the form of a half ester to the hydroxyl group of the resin by dehydration esterification to introduce a free carboxyl group. When a polybasic acid anhydride is used, it is introduced in the form of a half ester by ring-opening reaction with the hydroxyl group. In each case, it is preferred that the acid value of the resin be adjusted to 0.1 to 10 KOH mg/g. When the acid value is larger than 10, the speed of the reaction of the crosslinking agent with the hydroxyl group is too high, the adaptability to the coating operation is degraded. As the polybasic acid or anhydride, there can be used phthalic anhydride, isophthalic acid, adipic acid, azelaic acid, dodecanoic acid, maleic anhydride, succinic acid, tetrahydrophthalic anhydride, hexahydrophthalic anhydride, methyltetrahydrophthalic anhydride, methylhexahydrophthalic anhydride and trimellitic anhydride.

The hydroxyl value of the resin according to the invention is preferably in the range of from 50 to 250 KOH mg/g. If the hydroxyl value of the resin is smaller than 50, the speed of the reaction with the crosslinking agent is low, and if the hydroxyl value is larger than 250, the compatibility with other resins or the solvent solubility at the paint-forming step is degraded.

The process for the preparation of the resin of the present invention will now be described in detail. The aromatic vinyl monomer-allyl alcohol resin, for example, styrene-allyl alcohol resin, is heated and made molten at a temperature higher than 120° C. to remove water from the resin, $\epsilon$-caprolactone is added to the resin, a catalyst is added to promote the reaction, and the reaction is carried out at 120° to 230° C., preferably 150° to 220° C. If the carboxyl group is to be introduced, a polybasic acid anhydride is added at 120° to 150° C. after completion of the reaction, and the reaction of forming a half ester is carried out. The formed resin is dissolved in an organic solvent such as toluene or xylene and the resulting resin solution is added to a coating composition. As another process, there can be mentioned a process in which $\epsilon$-caprolactone and a polybasic acid or its anhydride are added to the aromatic vinyl monomer-allyl alcohol resin, the reaction is carried out at 200° to 230° C. in the presence of a catalyst until the acid value becomes smaller than 1, the temperature is lowered to 120° to 150° C., a polybasic acid anhydride is added to form a half ester and the acid value is adjusted to a predetermined level. The reaction may be carried out in the presence of a solvent such as toluene or xylene.

Known catalysts may be used for promoting the reaction. For example, a titanium compound such as tetrabutyl titanate, tetraisopropyl titanate or tetraethyl titanate, dibutyl tin oxide, dibutyl tin laurate, tin octylate or a tin halide such as tin chloride, tin bromide or tin iodide is used in an amount of 0.1 to 100 ppm, preferably 0.5 to 50 ppm.

When the resin of the present invention is mixed with a crosslinking agent and used as a coating composition, other resins such as alkyd resins, polyester polyols, acrylic polyol resins or epoxy resins may be used in combination with the resin of the present invention.

As the crosslinking agent, there may ordinarily be used diisocyanates such as isophorone diisocyanate, hexamethylene diisocyanate, xylene diisocyanate, hydrogenated xylene diisocyanate, tolylene diisocyanate, 4,4'-diphenylmethane diisocyanate and 4,4'-methylene-bis-(cyclohexyl isocyanate), adducts, oligomers and blocked products of these isocyanates, and isocyanate group-containing prepolymers. In addition to these isocyanate type crosslinking agents, there may be used melamine resins such as isobutylated melamine, n-butylated melamine and methylated melamine, and epoxy resins. Practically, various solvents, thinners, pigments and other additives may be incorporated according to customary procedures.

Even in the case where a crosslinking agent is not incorporated into the resin of the present invention, if cellulose nitrate, a vinyl chloride resin, a vinyl acetate resin or cellulose acetate butyrate is incorporated therein, the resin of the present invention may be used as a lacquer paint. Furthermore, the resin of the present invention may be used as a vehicle for an ink.

The present invention will now be described in detail with reference to the following Examples that by no means limit the scope of the invention. Incidentally, in these Examples, all parts are by weight.

EXAMPLE 1

A 4-neck flask equipped with a thermometer, a reflux cooler, a nitrogen introducing tube and a stirrer was charged with 4015 parts of a styrene-allyl alcohol copolymer resin, 365 parts of toluene and 0.073 part of tetrabutyl titanate, and the mixture was heated at 120° to 150° C. under reflux of toluene for 2 hours to remove 41 parts of water contained in the resin. Then, 3285 parts of ε-caprolactone was added to the mixture and reaction was carried at 160° C. for 13 hours. The reaction mixture was diluted with toluene to obtain a transparent resin solution having a non-volatile component content of 70.0% (as measured after drying at 150° C. for 2 hours; the same will apply hereinafter), a hydroxyl value of 95.6 (KOH mg/g; the same will apply hereinafter), an acid value of 0.91 (KOH mg/g; the same will apply hereinafter), a hue (Gardner color scale; the same will apply hereinafter) less than 1 and a viscosity (Gardner viscosity; the same will apply hereinafter) of T. In this Examples and subsequent Example, RJ-101 supplied by Monsanto Co. was used as the styrene-allyl alcohol copolymer resin.

EXAMPLE 2

The same 4-neck flask as used in Example 1 was charged with 2100 parts of a styrene-allyl alcohol copolymer, 900 parts of ε-caprolactone, 105 parts of phthalic anhydride, 100 parts of toluene and 0.0311 part of tetrabutyl titanate, and reaction was carried out at 170° to 210° C. under reflux of toluene for 22 hours. The reaction mixture was diluted with toluene to form a transparent resin solution having a non-volatile component content of 60.5%, a hydroxyl value of 66.3, an acid value of 0.36, a viscosity of Z and a hue of 2 to 3.

EXAMPLE 3

The same 4-neck flask as used in Example 1 was charged with 2450 parts of a styrene-allyl alcohol copolymer resin, 250 parts of toluene and 0.035 part of tetrabutyl titanate, and the mixture was heated at 120° to 150° C. for 2 hours under reflux of toluene to remove water contained in the resin. Then, 1050 parts of ε-caprolactone was added to the reaction mixture and reaction was carried out at 150° C. for 11 hours. The reaction mixture was diluted with toluene to form a transparent resin solution having a non-volatile component content of 70.1%, a hydroxyl value of 119, an acid value of 1.4, a viscosity of X and a hue less than 1.

EXAMPLE 4

The same 4-neck flask as used in Example 1 was charged with 1925 parts of a styrene-allyl alcohol copolymer resin, 200 parts of toluene and 0.035 part of tetrabutyl titanate, and the mixture was heated at 120° to 150° C. for 2 hours under reflux of toluene to remove water contained in the resin. Then, 1575 parts of ε-caprolactone was added to the reaction mixture and reaction was carried out at 160° C. for 11 hours. Then, 47 parts of phthalic anhydride was added and the reaction was carried out at 120° C. for 2 hours. The reaction mixture was diluted with toluene to form a transparent resin solution having a non-volatile component content of 70.3%, a hydroxyl value of 87.5, an acid value of 4.8, a viscosity of T and a hue of 1.

EXAMPLE 5

The same 4-neck flask as used in Example 1 was charged with 1650 parts of a styrene-allyl alcohol copolymer, 1350 parts of ε-caprolactone, 83 parts of phthalic anhydride, 100 parts of toluene and 0.0308 part of tetrabutyl titanate, and reaction was carried out at 200° to 210° C. under reflux of toluene for 17 hours until the acid value became 0.96. The temperature was lowered to 120° C., and 33 parts of phthalic anhydride was added and reaction was carried out at 120° C. for 1 hour. Then, the reaction mixture was diluted with toluene to form a transparent resin solution having a non-volatile component content of 61.2%, a hydroxyl value of 53, an acid value of 3.7 and a hue of 2.

REFERENTIAL EXAMPLES 1 THROUGH 5 AND COMPARATIVE EXAMPLES 1 THROUGH 3

The resins prepared in Examples 1 through 5 and commercially available polyol resins as comparative resins were mixed with a xylene diisocyanate polyisocyanate resin (Takenate D-110N supplied by Takeda Yakuhin Kogyo K. K.) so that the OH/NCO equivalent ratio was 1. Each composition was coated on a soft steel plate and forcibly dried at 60° C. for 60 minutes. Properties of the obtained coatings are shown in Table 1.

TABLE 1

| Properties of Coating Polyol Resin | Referential Example No. | | | | | Comparative Example No. | | |
|---|---|---|---|---|---|---|---|---|
| | 1 Example 1 | 2 Example 2 | 3 Example 3 | 4 Example 4 | 5 Example 5 | 1 polyester polyol (1) | 2 polyester polyol (2) | 3 coconut oil modified alkyd resin |
| Pencil hardness (Mitsubishi UNI) | B | H | HB | 5B | HB | 3B | 4B | 2B |
| Cross-cut adhesion test | 100/100 | 100/100 | 100/100 | 100/100 | 100/100 | 90/100 | 80/100 | 100/100 |
| Impact resistance (Du Pont type, ½", 500 g) | over 50 cm | 20 cm | 30 cm | over 50 cm | over 50 cm | over 50 cm | over 50 cm | 20 cm |
| Erichsen test (mm) | over 9 | over 9 | over 9 | over 9 | over 9 | over 9 | over 9 | over 9 |
| Bending test (T-bent) | OT | OT | OT | OT | OT | OT | OT | OT |
| Water resistance (50° C., 48 hrs) | ○ | ◎ | △ | △ | ◎ | X | | X |
| Acid resistance (5% HCl, 48 hrs) | ◎ | ◎ | ◎ | ◎ | ◎ | | X | X |
| Alkali resistance (5% NaOH, 48 hrs) | ◎ | ◎ | ◎ | ◎ | ◎ | | X | X |
| Stain resistance (black magic pen, room temperature, 48 hrs) | ○ | ◎ | ○ | ○ | ○ | X | X | X |
| Solvent resistance (100 times' rubbing with xylene) | ○ | ○ | ◎ | ○ | ○ | X | X | X |

Notes

Resins used in the Comparative Examples are as follows.

Polyester polyol (1): Desmophen 670 manufactured and supplied by Bayer AG.

Polyester polyol (2): Desmophen 1200 manufactured and supplied by Bayer AG.

Coconut oil-modified alkyd resin: Beckosol 1323-60-EL manufactured and supplied by Dainippon Ink Kagaku K. K.

The symbols used in Table 1 indicate results as follows:

◎ excellent; no change observed
○ good; only slight change observed
Δ fair; considerable change observed
X poor; great change observed.

The embodiments of the invention in which an exclusive property or privilege is claimed are defined are defined as follows:

1. A polyol resin obtained by reacting 95–40% by weight of an aromatic vinyl monomer-allyl alcohol copolymer with 5–60% by weight of ε-caprolactone, or ε-hydroxycaproic acid.

2. A polyol resin as claimed in claim 1, which has been modified by further reacting said resin with a polybasic acid or an anhydride thereof in an amount of up to 10 wt. percent, based on the weight of said polyol resin.

3. A polyol resin as claimed in claim 2, which has an acid value of 0.1 to 10 KOH mg/g and an OH value of 50 to 250 KOH mg/g.

4. A polyol resin as claimed in claim 1, wherein said aromatic vinyl monomer is styrene or α-methylstyrene.

5. A coating film obtained by reacting the polyol resin as defined in claim 1 with a crosslinking agent.

6. A process for manufacturing a polyol resin, which comprises the steps of:

heating and melting a copolymer of an aromatic vinyl monomer and allyl alcohol to remove water contained therein, and then reacting said copolymer with ε-caprolactone or ε-hydroxycaproic acid in the presence of a catalyst at 120° to 230° C.

7. A process as claimed in claim 6, wherein said catalyst is a peroxide compound.

8. A polyol resin which consists essentially of the reaction product prepared by reacting
(A) 40 to 95% by weight of a copolymer of allyl alcohol and an aromatic vinyl monomer, said copolymer having an OH value in the range of 180 to 260, a number average molecular weight in the range of 1000 1600, and a softening point in the range of 95° to 115° C., with
(B) 5 to 60% by weight of ε-caprolactone or ε-hydroxycaproic acid, and with
(C) up to 10% by weight of a polybasic acid or anhydride, wherein component (B) forms soft side chains graft copolymerized at the locations of the primary hydroxyl groups of said copolymer (A), said soft side chains having primary hydroxyl groups at the ends thereof.

9. A polyol resin as claimed in claim 8, wherein said polyol resin consists essentially of 50 to 80% by weight of (A), 20 to 50% by weight of (B), and 0 to 5% by weight of (C).

10. A polyol resin as claimed in claim 8, wherein said aromatic vinyl monomer is selected from the group consisting of styrene and α-methyl styrene.

11. A polyol resin as claimed in claim 8, wherein said polyol resin has an acid value in the range of 0.1 to 10 KOH mg/g and an OH value of 50 to 250 KOH mg/g.

12. A polyol resin as claimed in claim 8, wherein said polybasic acid or anhydride (C) is selected from the group consisting of phthalic anhydride, isophthalic acid, adipic acid, azelaic acid, dodecanoic acid, maleic anhydride, succinic acid, tetrahydrophthalic anhydride, hexahydrophthalic anhydride, methyltetrahydrophthalic anhydride, methylhexahydrophthalic anhydride and trimellitic anhydride.

13. A coating film obtained by reacting the polyol resin as defined in claim 8 with a crosslinking agent selected from the group consisting of diisocyanates, melamine resins, and epoxy resins.

* * * * *

UNITED STATES PATENT AND TRADEMARK OFFICE
CERTIFICATE OF CORRECTION

PATENT NO. : 4,435,542

DATED : March 6, 1984

INVENTOR(S) : Shoji Watanabe et al

It is certified that error appears in the above-identified patent and that said Letters Patent is hereby corrected as shown below:

Column 8, line 9; after "1000" insert ---to---.

Column 8, line 28; change "KOH mg/g" (both occurrences) to ---KOHmg/g---.

Signed and Sealed this

Seventh Day of August 1984

[SEAL]

Attest:

GERALD J. MOSSINGHOFF

Attesting Officer

Commissioner of Patents and Trademarks